(12) United States Patent
Leyendecker

(10) Patent No.: US 6,466,801 B2
(45) Date of Patent: Oct. 15, 2002

(54) TWO-WAY COMMUNICATION DEVICE WITH TRANSMISSION OF STORED SIGNAL DIRECTLY INITIATED BY USER

(75) Inventor: Robert R. Leyendecker, Blaine, WA (US)

(73) Assignee: Glenayre Electronics, Inc., Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,075

(22) Filed: Sep. 23, 1996

(65) Prior Publication Data

US 2002/0061774 A1 May 23, 2002

(51) Int. Cl.[7] .................................................. H04B 1/38
(52) U.S. Cl. ........................ 455/550; 455/575; 340/7.21
(58) Field of Search ............................... 455/31.1, 31.2, 455/31.3, 32.1, 38.1, 38.4, 507, 517, 575, 550, 552, 553, 566; 340/825.44, 311.1, 7.1, 7.2, 7.21, 7.51

(56) References Cited

U.S. PATENT DOCUMENTS

| 4,811,379 A | * | 3/1989 | Granfield .................... 455/31.3 |
| 4,873,520 A | * | 10/1989 | Fisch et al. ............. 340/825.44 |
| 4,875,038 A | * | 10/1989 | Siwiak et al. ............... 455/31.3 |
| 5,710,986 A | * | 1/1998 | Obayashi et al. ........... 455/553 |

* cited by examiner

Primary Examiner—Thanh Cong Le
(74) Attorney, Agent, or Firm—Christensen O'Connor Johnson Kindness PLLC

(57) ABSTRACT

A circuit for use in a two-way pager of a paging system to transmit voice messages. The circuit includes: a microphone to receive an analog audio signal provided by a user; an analog-to-digital (A-D) converter coupled to the microphone; a memory; a processor coupled to the memory and to the A-D converter; and a transmitter coupled to the processor. The analog audio signals are typically voice messages spoken by the user, which the A-D converter samples and digitizes. The processor stores the digitized voice message in the memory. The user can then transmit the stored digitized voice message through the transmitter, which is processed through the paging system and provided to the intended recipient. In a further refinement, the circuit includes a playback circuit that allows the user to listen to the stored digitized voice message before transmitting the voice message to the rest of the paging system.

36 Claims, 3 Drawing Sheets

TWO-WAY COMMUNICATION DEVICE WITH TRANSMISSION OF STORED SIGNAL DIRECTLY INITIATED BY USER

FIELD OF THE INVENTION

The present invention relates generally to paging systems, and more particularly to two-way paging systems that are adapted to receive voice messages from two-way pagers and automatically deliver the voice message to the intended recipient.

BACKGROUND

Most paging systems employ receive-only personal paging units. These personal paging units, commonly called "pagers", can receive pages, but cannot acknowledge whether a page has been received or transmit any other kind of information. To acknowledge receipt of a page, or to transmit other information, the page recipient must communicate with the sender using another system, such as a telephone.

In contrast, modern two-way paging systems employ personal paging units that can receive pages and also acknowledge receipt of pages. Additionally, many paging system equipment providers are developing two-way paging systems that can transmit other information, such as responses to electronic mail ("E-mail") messages.

Many consumers of telecommunication and paging services prefer two-way paging systems because these systems are more convenient for exchanging personal communications as compared to one-way, or receive-only paging systems. Thus, paging system equipment providers are working to produce reliable, cost-efficient two-way paging systems.

Generally, two-way paging systems include transmitters for sending pages to the personal paging units, receivers for receiving acknowledgments or other information from the personal paging units, a central controller that is linked to the receivers and transmitters, and a paging switch that coordinates the transmission of pages. In some two-way paging systems, the transmitters send pages to individual personal paging units with a command that a given unit acknowledge page receipt, or send other information, during a certain time slot or period. Thus, the transmitters can command personal paging units to transmit acknowledgments or return signals during different time slots to prevent congestion. Alternatively, a user of the personal paging unit may take some action to initiate a response signal, such as pressing a button on the paging unit. Such a personal paging unit may be programmed to transmit a negative acknowledgment signal if the user has not taken action within a specified time duration. However, these systems only provide for transmission of simple messages from the personal paging units.

The present invention expands the communications from the two-way pager.

SUMMARY

In accordance with the present invention, a circuit for use in a two-way pager of a paging system is provided. In one embodiment, the circuit includes: a sensor to receive an analog signal provided by a user; an analog-to-digital (A-D) converter coupled to the sensor; a memory; a control circuit coupled to the memory and to the A-D converter; and a transmitter coupled to the control circuit. In this embodiment, the sensor is a microphone to receive voice messages spoken by the user, which the A-D converter samples and digitizes. The control circuit, which in this embodiment is a processor, stores the digitized voice message in the memory. The user can then transmit the stored digitized voice message through the transmitter to the rest of the paging system, which is processed through the paging system and provided to the intended recipient. In a further refinement, the circuit includes a playback circuit that allows the user to listen to the stored digitized voice message before transmitting the voice message to the rest of the paging system.

In another embodiment, the circuit includes an input device, which in this case is a manually operated keypad. The user can configure the circuit to operate in several different modes. For example, in one mode, the circuit receives and digitizes analog signals as described above. The memory can be large enough to store several digitized signals. In another mode, the user can select one of the stored digitized messages to transmit through the transmitter to the rest of the paging system. In still another mode, the user can select a stored telephone number (i.e., the telephone number of the intended recipient) and transmit a selected digitized message along with the selected telephone number, which the paging system then sends to the intended recipient. In another mode, the user can update the telephone numbers stored in the memory.

In yet another embodiment, the circuit includes a receiver to receive digitized voice messages broadcast by the paging system. The circuit then stores the received digitized voice message in the memory. The user can then forward the received voice message to a desired recipient by transmitting the stored received voice message along with the telephone number of the selected recipient, which is then processed through the paging system and sent to the selected recipient.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

System

Figure 1:
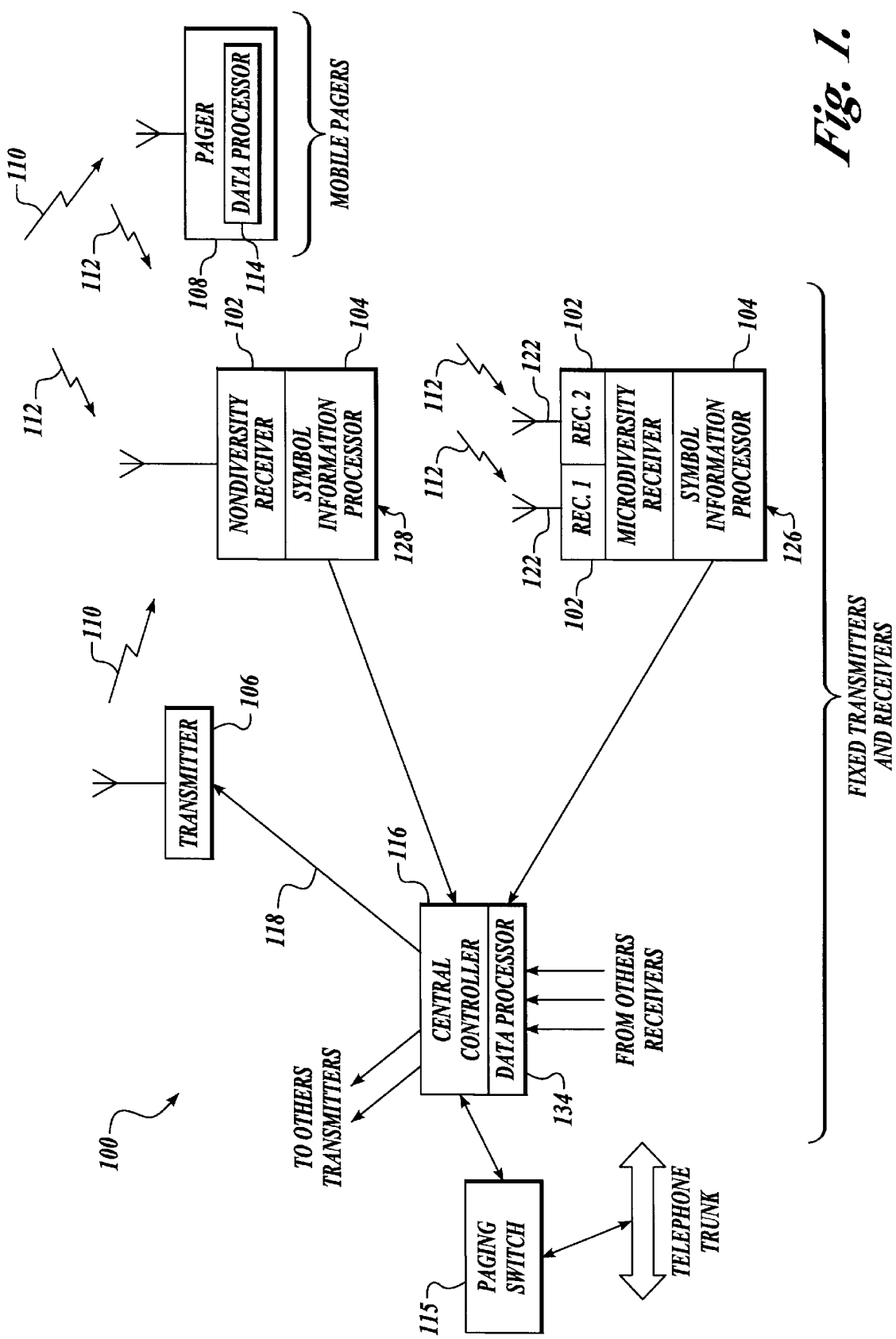
FIG. 1 is a block diagram of a two-way paging system in accordance with one embodiment of the present invention.

FIG. 1 is a block diagram of a two-way paging system 100 in accordance with one embodiment of the present invention. The system 100 includes one or more transmitters 106, a plurality of receivers 102, and at least one two-way personal paging unit or pager 108. The two-way pager 108 is capable of receiving transmissions or pages 110 from the transmitter 106 and of sending a reverse channel signal 112. The system 100 may also include receive-only pagers (not shown), which do not have the capability of sending response signals. Each two-way pager 108 includes a data processor 114, such as a conventional microprocessor. Each receiver 102 either includes a symbol information processor 104 or is linked to a symbol information processor 104, such as by a fiber-optic cable, radio channel or other communication link. The information processors are, in turn, linked to a central controller 116. The central controller 116 is, in turn, linked to a paging switch 115. The central controller 116 includes a data processor 134 and associated computer memory (not shown).

In general, the central controller 116 actuates the transmitter 106 to send the pages 110, and evaluates whether valid reverse channel signals 112 have been received. The reverse channel signal 112 from a two-way pager 108 is in the form of a digital packet. The reverse channel packet includes forward error correction encoding and digital symbols that each consist of a predetermined number of bits. A receiver 102 detects the reverse channel signal 112 and decodes the packet to verify the accuracy and identity of the digital symbols of the packet. The central controller 116 receives packets from different receivers 102 that detected the reverse channel signal 112 from the two-way pager 108. The central controller 116 then evaluates and/or combines the signals received by the central controller 116 to determine the most probable reverse channel signal 112 sent by the two-way pager 108.

Transmitters

The transmitter 106 generates radio signal transmissions or pages 110, in response to a message 118 sent from the central controller 116. Each page 110 identifies one of the personal paging units 108 to which the page is directed. A transmitter 106 may be co4ocated with a receiver 102 and/or the central controller 116, and can be of the type described in the commonly assigned U.S. patent application titled "Linear Transmitter Using Predistortion" filed Feb. 14, 1996, listing inventors Charles Brian Cox et al., application Ser. No. 08/601,118, which is expressly incorporated by reference herein.

Microdiversity Receivers

The receivers 102 are capable of receiving the response signals 112 from a two-way pager 108. The receivers 102, in general, filter and amplify received reverse channel signals 112 from two-way pagers 108 and extract information contained in the reverse channel signal. The receivers 102 can be microdiversity receivers of the type described in the commonly assigned U.S. patent application titled "Digital Diversity Receiver System" filed Mar. 4, 1996, listing inventors B. D. Buternowski et al., application Ser. No. 08/611,461, which is expressly incorporated by reference herein. In a microdiversity receiver, two receivers can be contained within a single housing. Each receiver is coupled to its own antenna, with the antennas being located at or close to the same site but separated sufficiently for spacial diversity of reception. For example, if one of the antennas experiences multipath cancellation of received reverse channel signals, the other antenna will be far enough away so as to be outside the multipath null. The second antenna may thus be receiving the transmission more clearly and with greater strength. The dual receiver includes an information processor for combining the received signals from the two receivers to produce packets which appear the same as if emanating from a single receiver, but which have the benefit of a better likelihood of being correct. Such a dual receiver is called a "microdiversity" receiver.

Personal Paging Unit

In general, the two-way personal paging unit 108 receives pages 110 from the transmitter. In response, the pager broadcasts one or more reverse channel signals 112 in the form of digital data packets. The reverse channel signal 112 may be sent automatically by the personal paging unit, in response to the received page (i.e., an acknowledgment or response signal). Alternatively, a user of the personal paging unit may take some action to initiate a response signal, such as pressing a button on the paging unit. A combination of automatic and user-initiated signals may also be sent, resulting in a plurality of response signals being sent by a single personal paging unit in response to a single page. The two-way personal paging unit 108, also referred to as a pager, is described further below in conjunction with FIGS. 2 and 3.

Figure 2:
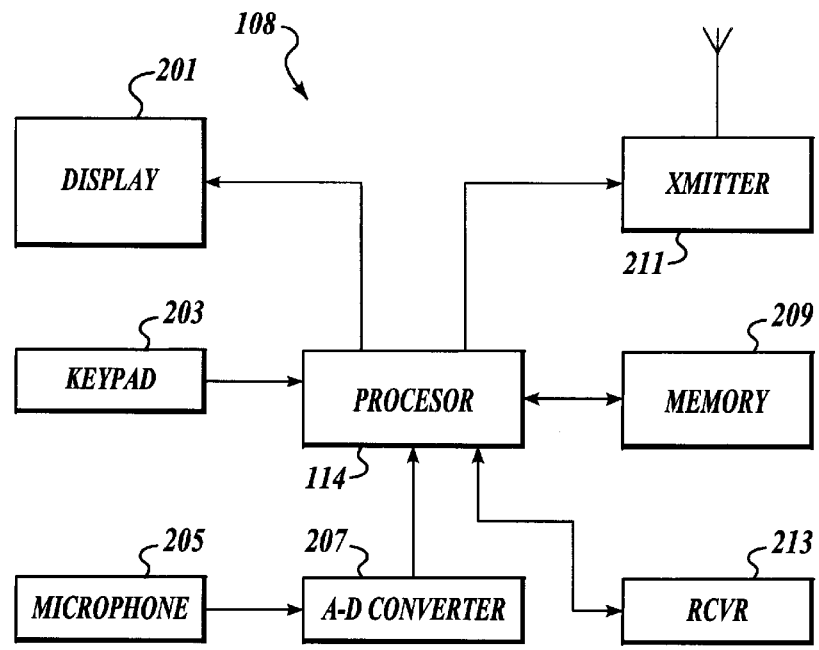
FIG. 2 is a block diagram of a portion of a personal paging unit in accordance with one embodiment of the present invention.

FIG. 2 is a block diagram of a portion of a personal paging unit 108, according to one embodiment of the present invention. The paging unit 108 includes a display 201, a keypad 203, a microphone 205, an analog-to-digital (A-D) converter 207, a memory 209, a receiver 213, and a transmitter 211, as well as the processor 114. The processor 114 can be any suitable microprocessor or microcontroller such as, for example, a model 68HC05 available from Motorola. Although a separate processor is described in this embodiment, in other embodiments, several functions including the processor may be included in a custom microcircuit. The processor 114 is coupled to access the memory 209 in the conventional manner to store and retrieve information. The memory 209 can be any suitable memory such as, for example, a dynamic random access memory (DRAM), a static random access memory (SRAM), and/or a read only memory (ROM). In one embodiment, the memory 209 includes a DRAM used primarily for storing data and a ROM for storing code executed by the processor 114. The memory may also include a non-volatile memory device, such as an EEPROM (electrically erasable programmable ROM), for storing infrequently updated information (e.g., fault data).

The processor 114 is coupled to receive signals from the keypad 203, the receiver 213 and the microphone 205 (through the A-D converter 207). The keypad 203 can be any suitable set of manually operated switches. In one embodiment, the keypad 203 contains push button switches corresponding to the numbers 0–9 and several special function keys, which are described below. The processor 114 is also coupled to control the operation of the display 210 and the transmitter 211. The receiver 213 can be any suitable receiver for receiving pages 110 (FIG. 1) similar to those used in commercially available pagers. Such receivers are small in size and have relatively low power requirements. The microphone 205 can be any suitable microphone such as, for example, a model MC1110 available from Armaco. In one embodiment, the A-D converter 207 is a model MAX165 available from Maxim, although any suitable A-D converter can be used.

The processor 114 is also coupled to provide signals to the display 201 and the transmitter 211. The processor 114 provides signals to the display 201 for displaying information received from pages 110 (FIG. 1), as is done in many conventional pagers. The processor 114 also provides signals to the transmitter 211 in order to generate response signals to acknowledge receipt of pages 110, as in conventional two-way pagers. The transmitter 211 can be any suitable radio frequency (RF) transmitter similar to those used in commercially available two-way pagers. In one embodiment, the processor 114 excites the transmitter 211 to generate a digitally coded response signal. However, unlike conventional pagers, the two-way pager 108 of the present invention is also capable of transmitting signals containing a digitized voice message provided by the user, as described below.

Reverse Channel Signals

The processor 114 is programmed to control the transmitter 211 to generate the RF reverse channel signal 112 to include a digital packet having a multi-bit synchronization segment, a data segment, a cyclic redundancy check (CRC) segment and a forward error correction (FEC) encoded segment. Error correction capabilities are included in the series of CRC parity bits and a series of Reed Solomon FEC parity bits.

The data segment of the response packet 112 contains a series of digital symbols, each representing a predetermined number of bits. The pager 108 sends a series of a plurality of possible symbols in each response packet, which can include a predetermined acknowledgment code. Each symbol is represented by a modulation of the RF signal, which in this embodiment is by continuous phase frequency shift keying (CPFSK). It is desirable for individual pagers to transmit short messages so that more pagers can share a common RF channel. This helps to minimize the total number of different RF channels required by a paging system. One or more bit symbols can be used as long as the modulation scheme fits within the available frequency band.

More specifically, using CPFSK modulation, each symbol is transmitted on a different subfrequency, where the subfrequencies are centered around one main frequency. Minimizing the number of possible symbols reduces the number of bits per symbol and the number of subfrequencies needed for the transmission of response signals. The transmitter and receiver become more complicated as the number of bits per symbol is increased. Usually, one or two bit symbols are used. For 2n symbols, where the subfrequencies are centered around the frequency F, the symbol bits are sent on the subfrequencies:

$$F+\frac{d}{2}, F-\frac{d}{2}, F+\frac{3d}{2}, F-\frac{3d}{2}, \ldots, F+\frac{(2n-1)d}{2}, F-\frac{(2n-1)d}{2} \quad (1)$$

where d represents the distance between subfrequencies, each subfrequency representing one signal. The number of bits per symbol is given by:

$$\log_2(M) \quad (2)$$

where M is the number of levels or subfrequencies needed to represent the symbols in the modulation scheme. For example, four subfrequencies are needed to represent a two bit symbol, one for each possible combination of two bits. The four distinct symbols can be represented by 00, 01, 10, and 11, which can translate to −3, −1, 1 and 3, for example. If the main frequency used is 900 MH, and if 1,600 Hz is desired between subfrequencies, the subfrequencies used will be 900.0008 MHz, 899.9992 MHz, 900.0024 MHz, and 899.9976 MHz.

A single bit per symbol can be used, or more bits per symbol. For example, three-bit symbols allow eight distinct symbols, but would require eight levels of CPFSK modulation. If each level is separated by 1600 Hz, a range of 7×1600, or 11,200 Hz would be required. The frequency separation may then be reduced at the penalty of poorer performance in noise.

Figure 5:
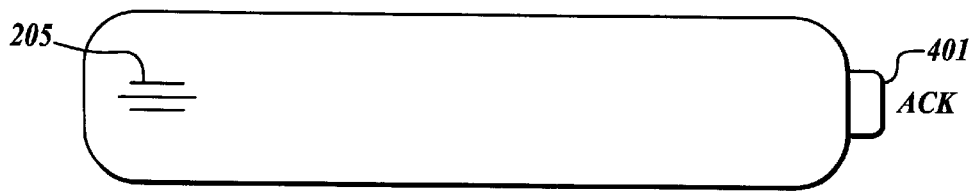
FIG. 5 is a top view of the embodiment of a personal paging unit depicted in FIG. 4.

The reverse channel signal 112 may be generated automatically by the processor after receipt of a page 110 or, alternatively, after the user actuates an "ACK" button on the pager 108 (see FIG. 5). Such a reverse channel signal is commonly referred to as a response or acknowledgment signal.

The personal paging unit 108 is also adapted to digitize voice signals input by the user. The user speaks into the microphone 205, thereby providing an analog voice signal into the personal paging unit 108. The A-D converter 207 samples and converts the analog voice signal into a digital voice signal that is stored in the memory 209. In one embodiment, the memory 209 has about a one Mbyte capacity for storing input data, which is large enough to store nine voice messages of about 14 seconds each when the analog voice signal is sampled at 8 kHz. In this embodiment, the voice messages are stored on a rotating basis. For example, as a new digital voice message is generated, the oldest of the stored digital voice messages is replaced by the new digital voice message. Larger memories may be used in other embodiments to store larger and/or more voice messages.

In this embodiment, the keypad 203 of the personal paging unit 108 includes a RECORD button (see FIG. 4) that can be actuated by the user to begin a mode for recording the analog voice signal. The recording operation continues while the RECORD button is actuated or until the maximum message duration is reached. The processor 114 can be programmed to start a timer when the RECORD button is actuated that counts down the time of a maximum length of voice signal that can be recorded. The processor 114 can cause a light emitting diode or LED (not shown) to flash when the timer is near expiration. Alternatively, the processor 114 can drive the display 201 to display the remaining recording time. In other embodiments, audio signals, vibrations, or other signaling schemes may be used to warn of the end of the maximum recording time. The timer may be a software timer implemented by the processor 114 or, alternatively, a separate hardware timing circuit may be used implement the timer. In view of this disclosure, such a separate timing circuit may be easily implemented by one skilled in the art without undue experimentation.

Furthermore, different schemes may be used to allow the user to terminate voice signal recording. For example, in an alternative embodiment, the user starts the recording operation with the initial actuation of the RECORD button and terminates the recording operation by actuating the RECORD button a second time.

After the user has recorded a voice signal, the user can send the voice signal through the paging system 100 (FIG. 1) to an intended recipient. In particular, the user can enter the phone number of the intended recipient (through the number buttons of the keypad 203) followed by actuating a SEND button on the keypad 203 (see FIG. 4). The processor 114 is configured so that when the SEND button is actuated, the personal paging unit 108 sends the entered phone number with the most recently stored digital voice message. Accordingly, the personal paging unit 108 allows a user to send digitized voice signals through a paging system, a feature that is not available in conventional pagers. This feature is supported by the paging system and, thus, does not require a separate communication system (e.g., a cellular telephone network) to send or receive voice messages. Further, in this embodiment, the voice messages are transmitted in a digital format, which offers the traditional advantages of higher noise immunity, compared to analog formats (e.g., single-side band amplitude modulation).

Alternatively, the phone number of the intended recipient can be programmed into one of several phone number memory "slot" locations in the memory 209. In this mode the user can send the message by simply actuating a MEMORY DIAL button on the keypad 203 (see FIG. 4), followed by actuating the number button on the keypad 203 corresponding to the memory slot location storing the desired phone number. The processor 114 detects the signals generated by the actuation of the MEMORY DIAL and number buttons. In response, the processor 114 accesses the appropriate location in the memory 209 and causes the transmitter 211 to transmit the digital voice signal and the selected phone number.

The phone number memory slot locations are easily updated, in this embodiment, as follows. The user actuates buttons on the keypad 203 in the following order: (a) the MEMORY DIAL button; (b) the RECORD button; (c) the number button corresponding to the phone number memory slot location; (d) the number buttons corresponding to the new phone number; and (e) the MEMORY DIAL button again.

In an alternative embodiment, the user can transmit a previously recorded voice signal rather than the most recently recorded voice signal. In this mode, the user first enters the phone number of the intended recipient through the number buttons on the keypad 203. The user then actuates a "#" button on the keypad 203 (see FIG. 4) and then actuates the number button corresponding to the voice signal memory location storing the previously recorded voice signal to be sent.

In another embodiment of the present invention, the personal paging unit 108 can also receive and store voice messages from the paging system 100 (FIG. 1). In this embodiment, the voice pages are received in the receiver 213, which the processor 114 then stores in the memory 209. The user can then forward the received voice pages that are stored in the memory 209 to another party though the paging system 100. For example, using the keypad 203, the user can enter the phone number of the intended recipient, then actuate a "*" button, and then actuate the number button corresponding to the number of the voice page memory location storing to the previously received voice page to be sent.

Upon receipt of a signal from a personal paging unit 108, the paging switch 115 (FIG. 1) operates as follows to forward a voice page to the intended recipient. First, the paging switch 115 identifies the reverse channel signal 112 (FIG. 1) as either an acknowledgment signal or a message signal. If the reverse channel signal 112 is a message signal, the message signal is deconstructed into two parts: (1) the phone number portion and (2) the digitized voice signal portion. The paging switch 115, using known outdial techniques, accesses an outgoing telephone trunk line to call the phone number provided in the phone number portion of the message signal. The digitized voice signal portion is converted back to an analog signal through a D-A converter (not shown) in the paging switch 115 and transmitted over the phone line (after the call has been answered) to the answering party.

If the outcall is not connected because, for example, the phone number is busy, then the analog voice signal is not transmitted by the paging switch 115. After a predetermined delay time, the outcall is attempted again. If after a predetermined number of tries, the outcall is still not successful, then a page is sent to the user indicating that the outcall was unsuccessful. This page can take the form of an automated voice message from the paging system or an alphanumeric code that the user understands. Alternatively, if the outcall is unsuccessful, then an automated voice message may be left on the voice mailbox of the user.

Additionally, assuming that the outcall is successful and the analog voice signal is successfully delivered, the paging terminal may also allow the party answering the outcall to request that the paging system repeat the message. Of course this request is not made when the outcall is answered by an answering machine or voicemail. However, in those occasions where a person does answer the outcall, the recipient can request the paging system to repeat the message by, for example, pressing a predetermined key on the telephone.

Figure 3:
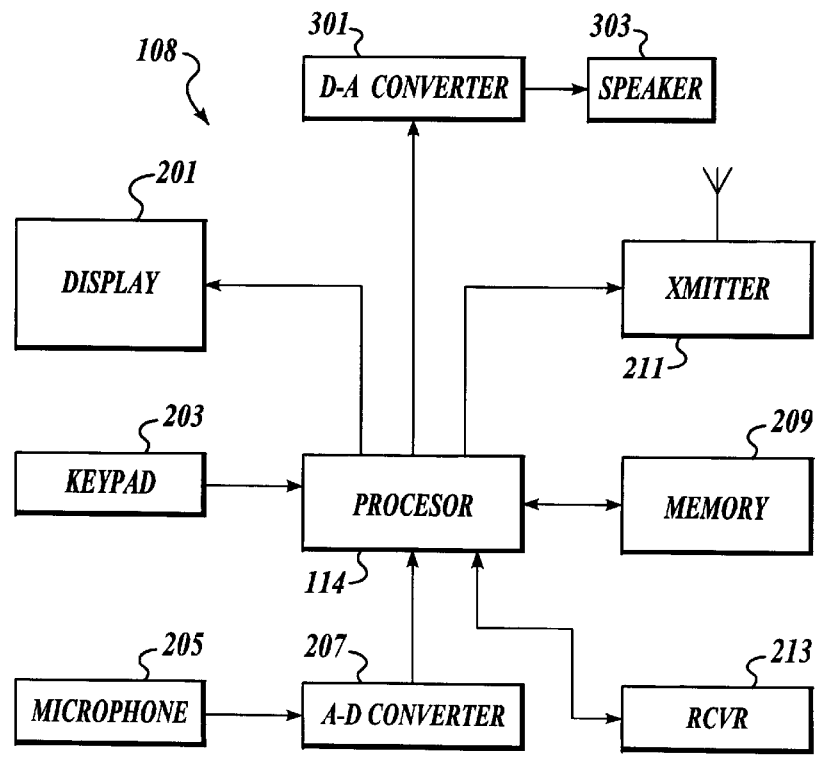
FIG. 3 is a block diagram of a portion of a personal paging unit in accordance with another embodiment of the present invention.

FIG. 3 is a block diagram of a portion of a second embodiment of a two-way paging unit 300, according to the present invention. In this embodiment, the pager 300 is substantially identical to the pager 108 (FIG. 2), except that pager 300 includes a D-A converter 301 and a speaker 303 so that any of the recorded digitized voice signals can be played back. In this embodiment, the keypad 203 includes a PLAY button (see FIG. 4), which the user actuates to start the playback mode. The user then actuates the number button on the keypad 203 corresponding to the voice signal memory location storing the digital voice signal to be played back. In response, the processor 114 accesses the memory 209 provides the stored digital voice signal to the D-A converter 301. The D-A converter 301 converts the digital voice signal to an analog signal, which is then provided to the speaker 303. The speaker 303 then converts the electrical analog signal to an audio signal that the user can hear. The user can advantageously use the playback operation to verify the voice message before transmitting the voice message as described above in conjunction with FIG. 3.

Figure 4:
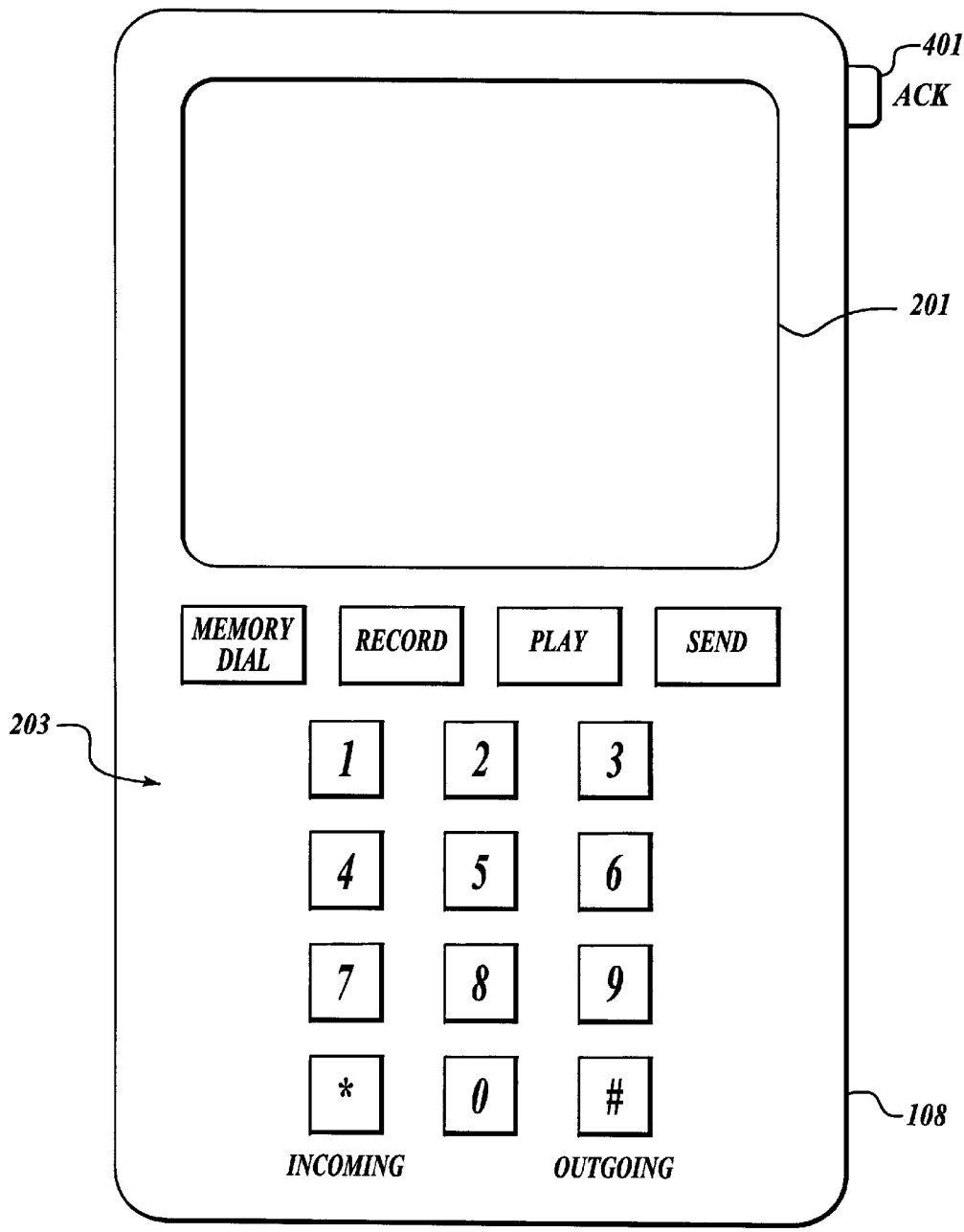
FIG. 4 is a plan view of a personal paging unit in accordance with the present invention.

FIG. 4 is a plan view of one embodiment of the two-way pager 300 according to the present invention. The display 201 in this embodiment is a liquid crystal display (LCD), which the processor 114 (FIG. 3) actuates to display alphanumeric characters corresponding to pages 110 received by the two-way pager 300. The keypad 203 includes several buttons having marked thereon the numbers 0–9, "MEMORY DIAL", "RECORD", "PLAY", "SEND", "*" and "#". The keypad 203 is manually operated by the user to enter data (e.g., phone numbers), record and playback voice signals, and transmit digital reverse channel signals 112 (FIG. 1), as described above in conjunction with FIGS. 2 and 3. The two-way pager 300 also includes the ACK button 401 on the side of the two-way pager 300. The user can actuate the ACK button 401 to generate an acknowledgment signal in response to receiving a page 110 (FIG. 1), as described above in conjunction with FIG. 2. FIG. 5 is a top view of the two-way pager 300 depicted in FIG. 4, which shows the location of the microphone 205.

The embodiments of the two-way pager described above are illustrative of the principles of this invention and are not intended to limit the invention to the particular embodiments described. For example, in view of this disclosure, those skilled in the art of pagers can implement an embodiment using a state machine or application specific integrated circuit (ASIC) instead of a processor, without undue experimentation. In addition, the processor and any of the other discrete circuits described above can be incorporated into an ASIC or distributed over several ASICs. Of course, modulation schemes different from the CPFSK modulation can be used in other embodiments. Further, different embodiments may omit the error correction capability. Accordingly, while the preferred embodiment of the invention has been illustrated and described, it will be appreciated that in view of the present disclosure, various changes can be made therein without departing from the spirit and scope of the invention.

The embodiments of the invention in which an exclusive property or privilege is claimed are defined as follows:

1. A circuit for use in a two-way communication device of a communication system, said circuit comprising:
   a sensor adapted to receive a message provided by a user;
   an analog-to-digital (A-D) converter coupled to said sensor, said A-D converter being operative to output a digital signal dependent on said message provided by said user;

a memory operative to store data;

a control circuit coupled to said memory and to said A-D converter, said control circuit operative to access said memory; and a transmitter coupled to said control circuit, said transmitter operative to transmit an electromagnetic signal;

wherein said circuit is operative to store said digital signal in said memory; and wherein said circuit is further operative to transmit an electromagnetic signal dependent on said stored digital signal when directly initiated by said user, said user directly initiating transmission of the electromagnetic signal after said digital signal is stored, said user thus having an opportunity to review said message before transmission.

2. The circuit of claim 1 wherein said sensor comprises a microphone and said message is a voice message.

3. The circuit of claim 2 wherein said electromagnetic signal is contained in a frequency band reserved for said communication system.

4. The circuit of claim 3 further comprising an input device coupled to said control circuit, said input device operative to provide control signals to said control circuit in response to commands provided by said user.

5. The circuit of claim 4 wherein said circuit is operative to store in said memory a plurality of digital signals dependent on a plurality of voice messages.

6. The circuit of claim 5 wherein said circuit is operative to transmit an electromagnetic signal dependent on a selected digital signal of said plurality of digital signals stored in said memory, said selected digital signal being selected by said user through said input device.

7. The circuit of claim 4 wherein said circuit is operative to warn the user that said voice message is approaching a maximum duration.

8. The circuit of claim 4 wherein said input device comprises a manually-operated switch.

9. The circuit of claim 4 wherein said control circuit comprises a processor.

10. The circuit of claim 4 further comprising a playback circuit, wherein said playback circuit is operative to allow said user to listen to said voice message stored in said memory.

11. The circuit of claim 10 wherein said playback circuit comprises a digital-to-analog (D-A) converter coupled to said control circuit and a speaker coupled to said D-A converter.

12. The circuit of claim 4 further comprising a receiver coupled to said control circuit, said circuit operative to receive a broadcasted voice message and store a digital signal dependent on said received voice message in said memory.

13. The circuit of claim 12 wherein said circuit is operative to transmit an electromagnetic signal dependent on said received voice message.

14. The circuit of claim 1 wherein said electromagnetic signal contains data corresponding to a telephone number of a selected recipient.

15. The circuit of claim 4 wherein said circuit is operative to be configured by said user through said input device to store in said memory a plurality of telephone numbers.

16. The circuit of claim 14 wherein said electromagnetic signal is configured to cause a switch of said communication system to send said telephone number a voice-band message that is dependent on said stored digital signal.

17. The circuit of claim 1 wherein said circuit is configured so that said user can selectively initiate transmission of the electromagnetic signal independently of the two-way communication device receiving a page.

18. A two-way communication device for use in a communication system, said communication device comprising:

a microphone adapted to receive a message provided by a user;

an analog-to-digital (A-D) converter coupled to said microphone, said A-D converter being operative to output a digital signal dependent on said message provided by said user;

a memory operative to store data;

a control circuit coupled to said memory and to said A-D converter, said control circuit operative to access said memory; and a transmitter coupled to said control circuit, said transmitter operative to transmit an electromagnetic signal;

wherein said circuit is operative to store said digital signal in said memory, and wherein said circuit is further operative to transmit an electromagnetic signal dependent on said stored digital signal when directly initiated by said user, said user directly initiating transmission of the electromagentic signal after said digital signal is stored, said user thus having an opportunity to review said message before transmission.

19. The two-way communication device of claim 18 wherein said message is a voice message.

20. The two-way communication device of claim 19 wherein said electromagnetic signal is contained in a frequency band reserved for said communication system.

21. The two-way communication device of claim 20 further comprising a playback circuit, wherein said playback circuit is operative to allow said user to listen to said voice message stored in said memory.

22. The two-way communication device of claim 21 wherein said playback circuit comprises a digital-to-analog (D-A) converter coupled to said control circuit and a speaker coupled to said D-A converter.

23. The two-way communication device of claim 20 further comprising a receiver coupled to said control circuit, said two-way communication device operative to receive a broadcasted voice message and store a digital signal dependent on said received voice message in said memory.

24. The two-way communication device of claim 23 wherein said two-way communication device is operative to transmit an electromagnetic signal dependent on said received voice message.

25. The two-way communication device of claim 20 further comprising an input device coupled to said control circuit, said input device operative to provide control signals to said control circuit in response to commands provided by said user.

26. The two-way communication device of claim 20 wherein said two-way communication device is operative to store in said memory a plurality of digital signals dependent on a plurality of voice messages.

27. The two-way communication device of claim 20 wherein said two-way communication device is operative to transmit an electromagnetic signal dependent on a selected digital signal of said plurality of digital signals stored in said memory, said selected digital signal being selected by said user through said input device.

28. The two-way communication device of claim 18 wherein said electromagnetic signal contains data corresponding to a telephone number of a selected recipient.

29. The two-way communication device of claim 28 wherein said electromagnetic signal is configured to cause a switch of said communication system to send to said telephone number a voice-band message that is dependent on said stored digital signal.

30. The two-way communication device of claim 28 wherein said two-way communication device is operative to be configured by said user through said input device to store in said memory a plurality of telephone numbers.

31. The method of claim 18 wherein said two-way communication device is configured so that said user can selectively initiate transmission of the electromagnetic signal independently of the two-way communication device receiving a page.

32. A method for transmitting messages from a two-way communication device in a communication system, the method comprising:

storing a message in the two-way communication device provided by a user;

including a telephone number of a recipient in said message; and transmitting said message to said recipient through a switch of said communication system, said user directly initiating said transmitting of said message after storing said message in the two-way communication device, said user thus having an opportunity to review said message before transmission.

33. The method of claim 32 wherein said user initiates said transmitting independently of said two-way communication device receiving a page.

34. The method of claim 32 wherein said message includes a digitized voice message portion.

35. An apparatus for transmitting messages from a two-way communication device in a communication system, the apparatus comprising:

means for storing a message in the two-way communication device provided by a user;

means for including a telephone number of a recipient in said message; and means for transmitting said message to said recipient through a switch of said communication system, said user directly initiating said transmitting of said message after storing said message in the two-way communication device, said user thus having an opportunity to review said message before transmission.

36. The apparatus of claim 35 wherein the apparatus is further configured so that said user can selectively initiate transmission of the electromagnetic signal independently of the two-way communication device receiving a page.

* * * * *

UNITED STATES PATENT AND TRADEMARK OFFICE
CERTIFICATE OF CORRECTION

PATENT NO. : 6,466,801 B2
DATED : October 15, 2002
INVENTOR(S) : R.R. Leyendecker It is certified that error appears in the above-identified patent and that said Letters Patent is hereby corrected as shown below:

<u>Title page,</u>
Item [56], References Cited, OTHER PUBLICATIONS, "Talk Back,"
*Popular Mechanics* Web Site, The Hearst Corporation, 1996. --

Signed and Sealed this

Nineteenth Day of August, 2003

JAMES E. ROGAN
*Director of the United States Patent and Trademark Office*